(12) United States Patent
Duplock (10) Patent No.: US 6,415,449 B2
(45) Date of Patent: Jul. 9, 2002

(54) GARMENT

(75) Inventor: Polly Duplock, Aberdeen (GB)

(73) Assignee: Multifabs Survival Limited, Aberdeen (GB)

( * ) Notice: Subject to any disclaimer, the term of this patent is extended or adjusted under 35 U.S.C. 154(b) by 0 days.

(21) Appl. No.: 09/737,659

(22) Filed: Dec. 13, 2000

(30) Foreign Application Priority Data

Dec. 15, 1999 (GB) .............................................. 9929500

(51) Int. Cl.⁷ ................................................ A41D 27/24
(52) U.S. Cl. ................................ 2/275; 2/2.15; 112/419
(58) Field of Search ...................... 2/2.15, 69, 456–458, 2/2.11, 2.14, 79, 227, 2.16, 69.5, 85, 93, 108, 82, 275, DIG. 5, 274; 112/418, 419; 156/91, 93, 73.5, 308.4; 428/102, 104, 121, 920

(56) References Cited

U.S. PATENT DOCUMENTS 2,115,368 A * 4/1938 Lustberg ........................ 2/275

| | | | | |
|---|---|---|---|---|
| 3,686,064 A | * | 8/1972 | Bonnet et al. | ............ 156/274.4 |
| 4,190,010 A | * | 2/1980 | Bibby | ......................... 112/419 |
| 4,276,341 A | | 6/1981 | Tanaka | |
| 4,599,075 A | | 7/1986 | Nygård | |
| 5,267,519 A | | 12/1993 | Uglene et al. | |
| 5,631,074 A | | 5/1997 | Herlihy, Jr. | |
| 5,742,936 A | | 4/1998 | Tronc | |

FOREIGN PATENT DOCUMENTS

| | | |
|---|---|---|
| EP | 0 701 782 | 3/1996 |
| EP | 0 707 802 | 4/1996 |
| GB | 2 105 573 | 3/1983 |
| GB | 2 110 069 | 6/1983 |
| WO | 95/22262 | 8/1995 |
| WO | 99/01046 | 1/1999 |

* cited by examiner

Primary Examiner—Gloria M. Hale
Assistant Examiner—Tejash Patel
(74) Attorney, Agent, or Firm—Smith-Hill and Bedell (57) ABSTRACT

A survival garment (10) is disclosed which is suitable for wearing under a layer of clothing. The garment is a close fitting one piece, intermediate dry suit formed of a substantially waterproof laminated material (30). The material (30) includes a first thermally insulating layer (32) and a second substantially waterproof layer (31).

25 Claims, 8 Drawing Sheets

GARMENT

FIELD OF THE INVENTION

The invention relates to a garment, and particularly but not exclusively to a garment suitable for protecting a wearer from the effects of immersion in cold water.

BACKGROUND OF THE INVENTION

Survival suits are worn to improve the chances of survival of the wearer in a hazardous water environment, for example in the case of an occupant of a helicopter which has ditched at sea.

In other situations, for example on an oil rig at sea where workers are expected to work over the side of the rig, survival suits are cumbersome and impede normal operation. In such cases, there is a tendency to wear lifejackets only. Lifejackets provide buoyancy and protect the airways, but they provide little or no protection against the effects of cold water immersion.

SUMMARY OF THE INVENTION

According to one aspect of the present invention there is provided a garment suitable for wearing under a layer of clothing, the garment being configured whereby movement of a wearer is substantially unrestricted, and the garment being formed of a substantially waterproof material.

The garment may be a survival garment.

The garment may be suitable for wearing over a layer of clothing. Preferably the garment is a one-piece suit. The garment may be in the form of a close fitting suit. Further, the garment may be suitable for wearing as an intermediate dry suit.

The garment may comprise one or more portions. The garment preferably comprises a torso portion to cover the torso of the wearer, arm portions to cover the arms of the wear and leg portions to cover the legs of the wearer.

The portion or portions may consist of one or more parts. The part or parts may be configured such that movement of the wearer is substantially unrestricted. In one embodiment, each arm portion consists of one arm section. The torso portion may consist of a front torso section and a back torso section. The leg portions may consist of a front leg section and a back leg section. The front leg section may comprise an upper front leg section, a knee sectoion and a lower front leg section.

In another embodiment, each arm portion consists of a main sleeve section and an end sleeve section. A single main body part may be provided for each leg portion and one side of the torso portion. A neck portion may be provided to extend around the neck and be attached to each main body part and each are part.

The garment may be provided with sealing means at the end of the arm portions, and the neck portion, for preventing water from entering the inside of the garment when in use. In one embodiment sealing means may be provided at the end of the leg portion. The sealing means may be integrally formed with the garment. The sealing means may be attached to the garment by sewing and/or gluing and/or taping and/or heat treatment. The sealing means preferably comprise fittings which fit closely to the skin of the wearer. The fittings may comprise skin-tight fittings such as cuffs and/or sleeves. In this way the garment is made water-tight. In another embodiment, each leg portion may include a sock to be received over a foot of the wearer.

The skin-tight fittings may be made from an elastic material. The elastic material may comprise a high stretch elastomer. The high stretch elastomer may be coated with a material of a low friction for allowing easy donning and doffing of the garment.

The garment may be provided with a sealable opening for donning and doffing of the garment. The opening may be sealable by means of a waterproof zip. The zip may be provided on the garment in such a way as to enable the wearer to open and seal the opening. In one embodiment, the opening may be provided on the garment such that when the opening is sealed, the zip partially surrounds the neck portion and extends to the front of the garment. In another embodiment, the opening may be provided on the garment such that the zip extends around the torso portion, preferably in a helical or corkscrew manner. The advantage of these arrangements of the zip is that it does not impede mobility and comfort of the wearer.

The zip may be integrally formed with the garment. The zip may be provided on the torso portion. The zip may be provided on the front torso part and the back torso part. The zip may be attached to the garment by means of sewing and/or gluing and/or taping and/or heat treatment.

The material may be selected such as to protect the wearer of the garment from cold shock and protect the wearer against immersion hypothermia. The material may be breathable. The material may also be thermally insulated to prevent the wearer from losing heat. The garment may be formed of a lightweight material. The material may be a laminated material.

The laminated material may comprise at least two layers, preferably three layers. The laminated material may comprise an outer layer, an intermediate layer and an inner layer, the inner layer being adapted to be worn closest to the wearer. The intermediate layer may comprise a substantially water-proof membrane, which may be breathable. In one embodiment, the intermediate layer is formed from a synthetic material suitably a fluorocarbon membrane, for example a polytetrafluoroethylene membrane. The outer layer may comprise of a material suitable for protecting the intermediate layer against external abrasion. The outer layer may be formed of a suitable synthetic material, for example, a polyester or nylon, or polychal. The outer layer is preferably formed by knitting, and is advantageously fire retardant.

The inner layer may consist of a material having thermal insulating properties to prevent the wearer from losing heat. The thermal insulating material may consist of a fleece material, for example a polyester fleece material.

According to another aspect of this invention there is provided a survival garment formed of a material comprising a first insulating layer and a second water-resistant layer, the garment being so constructed that the first layer is intended to be arranged closest to the wearer.

The second layer is preferably substantially waterproof, thereby preventing the passage of liquid water therethrough.

Preferably, the second layer is a material capable of allowing the passage of water vapour therethrough, but substantially preventing the passage of liquid water therethrough. Such a material is generally known in the art as breathable.

Preferably, the garment includes a third layer arranged on the opposite face of the second layer to the first layer, the third layer being suitable for protecting the second layer, for example from damage or abrasion.

The first layer may be formed of a fleece material, for example a polyester fleece material. The second layer may be in the form of a membrane, wherein the membrane is preferably breathable. A suitable such membrane is one formed from a fluorocarbon, for example polytetrafluoroethylene. The third layer may be formed from a synthetic material, for example polyester or nylon, and is preferably formed by knitting.

The garment may be formed from said parts being interconnected by sewing and/or gluing and/or heat treatment. The parts may be interconnected in such a way that the inner layers of each part are arranged in engagement with each other such that the respective inner layers engage each other and the edges face away from the wearer. The seam may be covered by a sealing member. The sealing member may comprise tape and/or hot melt adhesive tape. In this way it is achieved that seams of the garment are made waterproof, with the tape being applied to the outside layer of the garment.

BRIEF DESCRIPTION OF THE DRAWINGS

Embodiments of the present invention will now be described by way of example only and with reference to the accompanying drawings, in which.

DETAILED DESCRIPTION OF THE INVENTION

Figure 1:
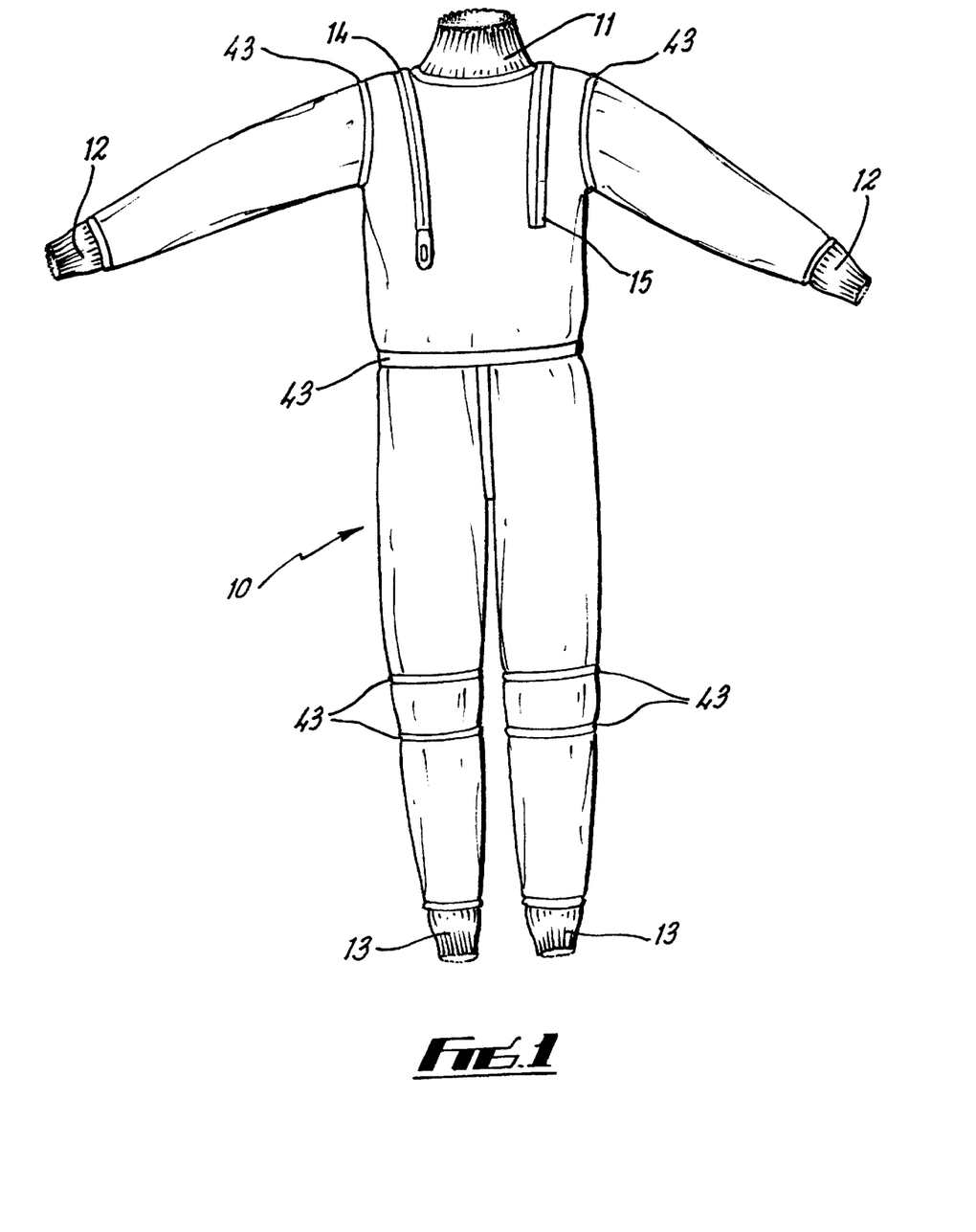
FIG. 1 shows a diagrammatic front view of an embodiment a garment according to the invention.
Figure 2:
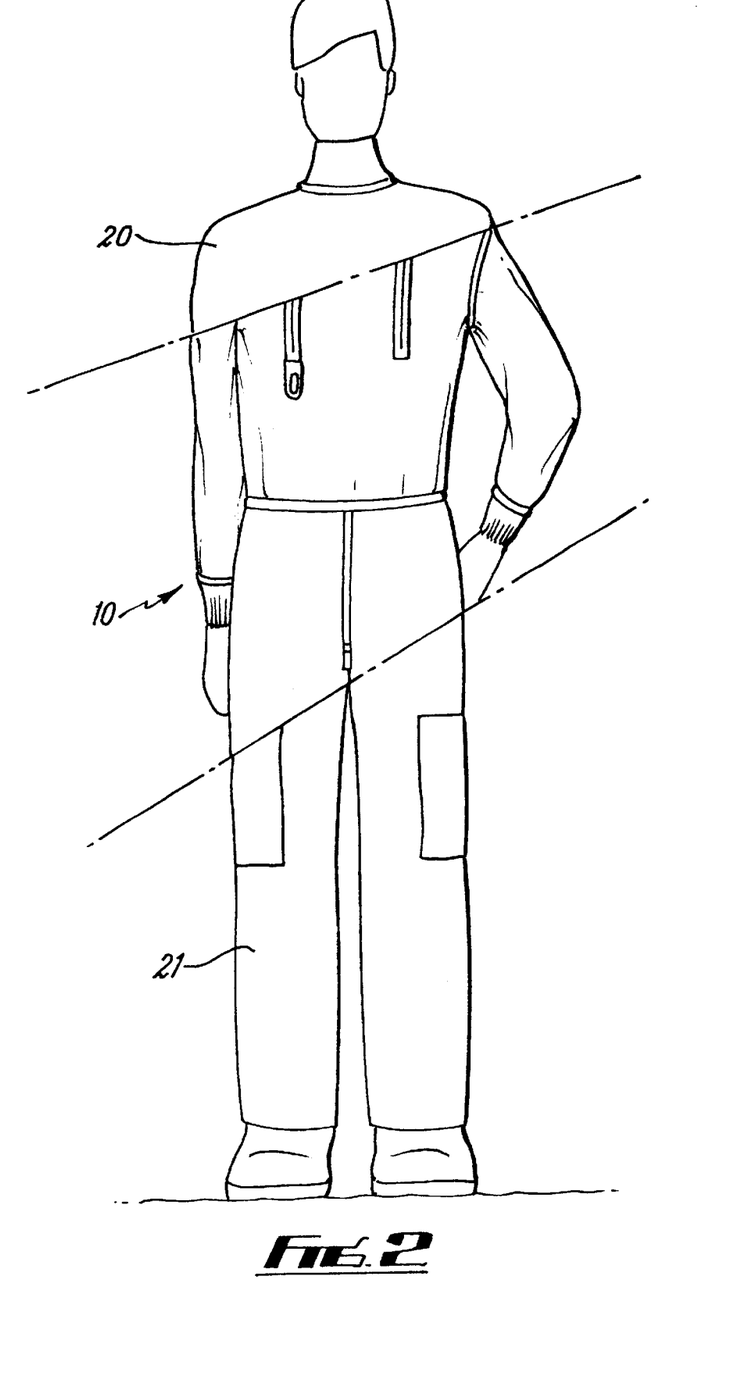
FIG. 2 shows a diagrammatic part sectional front view of the embodiment shown in FIG. 1 worn by a wearer.
Figure 5:
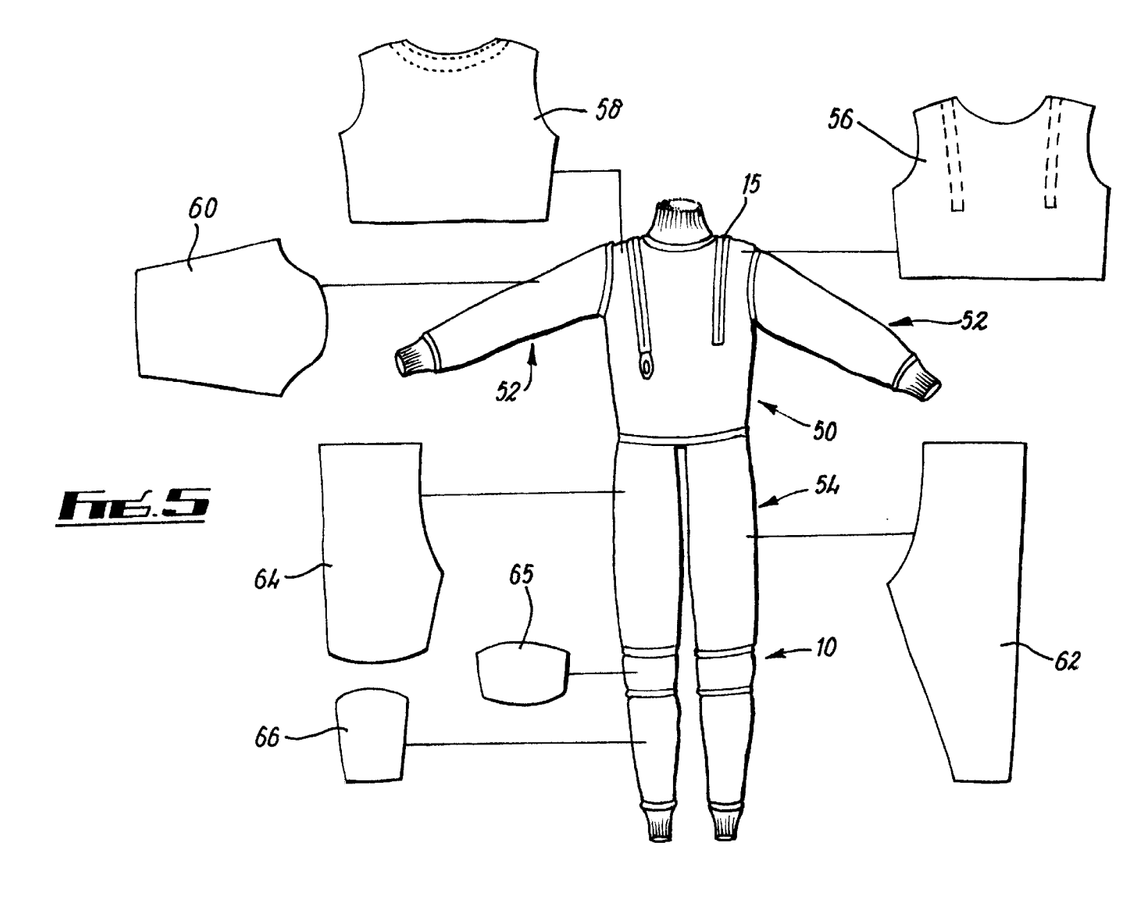
FIG. 5 shows a diagrammatic front view showing the parts of which the embodiment of FIG. 1 is formed.

Referring to the drawings of FIGS. 1, 2 and 5 a survival garment 10 is shown, which is in the form of a survival garment, and which consists of an article of clothing made from a lightweight material which does not significantly impair movement of the wearer. This allows the wearer to carry out a wide range of physical activities.

As is shown in FIG. 2 of the drawings the garment 10 can be worn as an intermediate layer over a layer of clothing such as underwear 20. The garment 10 is protected by an outer layer of clothing 21. The garment 10 does not restrict the performance of the outer layer of clothing, nor does it impede the wearer.

Water is prevented from entering the inside of the garment 10 by sealing means in the form of a neck seal 11, wrist seals 12 and ankle seals 13. These seals consist of an elastic material which fits closely to the skin to achieve a water-tight seal when wearing the garment 10.

The garment 10 further comprises an opening 14 which is provided partially around the neck seal 11. The opening 14 permits the wearer to get easily in and out of the garment 10. The opening 14 is sealable by means of a waterproof zip 15 which is provided on the garment. This waterproof zip 15, when closed, is shaped like a horseshoe around the neck seal 11 with the stems of the horseshoe being located at the front of the garment 10 as shown in FIGS. 1, 2 and 5 of the drawings. The opening 14 does affect the mobility and comfort of the wearer.

The seals 11, 12, 13 are attached to the garment 10 by means of gluing and taping to achieve a fully water-tight seal. The waterproof zip 15 is connected to the garment 10 in a similar fashion.

Figure 3:
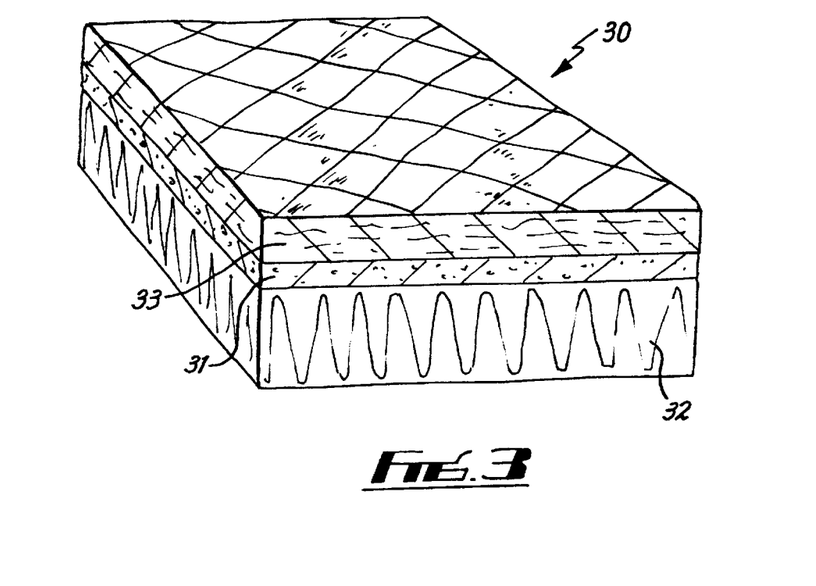
FIG. 3 shows a detail of a material of which a survival garment is formed.

As shown in FIG. 3 of the drawings the material 30 from which the garment 10 is made is laminated and may be in the form of a trilminate. The intermediate layer is formed by a waterproof breathable membrane 31. This membrane 31 prevents liquid water from entering the inside of the garment 10, but allows moisture and perspiration to pass through to the outside of the membrane 31. The membrane 31 consists of a polytetrafluoroethylene material, for example as sold under the trade mark GORE-TEX. The inside of the garment 10 closest to the wearer is formed by an inside layer of an insulating material 32. This material prevents the wearer from losing too much body heat when immersed in cold water. The insulating material 32 consists of a polyester fleece material. The outside layer of the material 30 consists of a protective material 33 for protecting the membrane 31 against abrasion, wear and tear. This material 33 is in the form of a knitted polyester or polychal FR. This has the advantage that it does not obstruct the pores of the membrane 31 and thus does not impair the functioning of the membrane 31.

Figure 4:
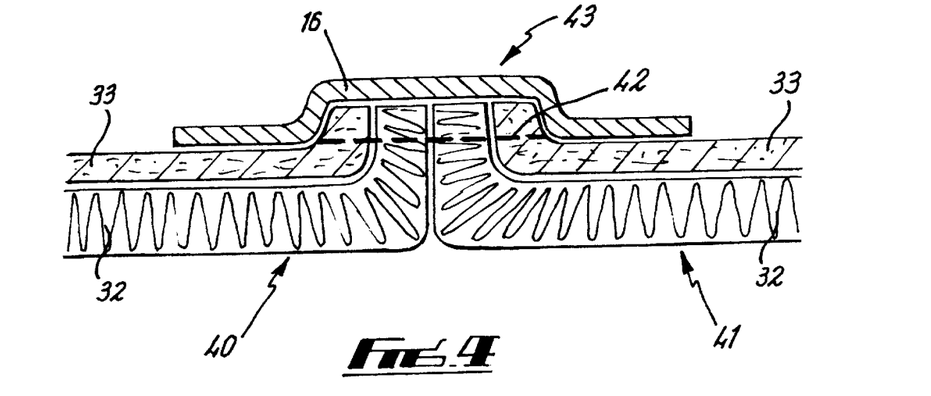
FIG. 4 shows a detail of a cross-section of a seam covered by a sealing member of the garment.

In FIG. 4 of the drawings the connection of two parts 40 and 41 of the material 30 is shown at the end portions of the respective parts 40, 41. The inside layers 32 are placed together. The respective parts are sewn together by means of stitching 42 to form a seam 43. The seam 43 then lies on the outside of the material 30, with the edges of the respective end portions lying outside the outside layer of protective material 33. To prevent water from entering the garment 10 via the seam 43, more in particular via the exposed inside of insulating material 32, a sealing member in the form of a tape 16 is applied over the seam 43. The tape 16 extends across the seam 43 onto the outside layer 33 of the material 30. In FIGS. 1 and 5 of the drawings the various taped seams 16 are also shown. In this way it is achieved that the edges of the material 30 and the tape 16 lie on the exterior of the garment 10. This prevents any discomfort, which may arise from bulk of seams 43 lying next to the skin of the wearer.

In FIG. 5 of the drawings there is shown the shape and configuration of the various parts 56, 58, 60, 62, 64, 65, 66 of which the garment 10 is formed. The parts 56, 58, 60, 62, 64, 65, 66 are interconnected by stitching and sealing as discussed above and shown in FIG. 4 of the drawings. The shape of the various parts 56, 58, 60, 62, 64, 65, 66 is chosen such that the garment 10 does not impede mobility of the wearer.

The torso portion 50 consists of a front part 56 and a back part 58, thereby substantially forming a vest. In dotted line, the position of the zip 15 on the parts 56, 58 is also shown. The arm portions 52 consist each of one integral arm part 60. The arm parts 60 are of an approximately trapezoidal shape with one side being approximately rounded.

The leg portions 54 consist of a back leg part which covers the back of the legs of the wearer. This back leg part 62 is of an approximate trapezium shape. The front leg part consists of an upper front leg part 64, a knee part 65 and a lower front leg part 66. The upper front leg part 64 is of an approximately rectangular shape. The knee part 65 is approximately trapezium shaped with rounded sides. The lower front leg part 66 is also approximately trapezium shaped. The leg portions 54 constructed from the parts 62, 64, 65, 66 offer comfort and unrestricted movement to the wearer.

Referring to FIGS. 6 to 9, there is shown a further embodiment in the form of a garment 110 formed from the same material as described in respect of the garment shown in FIGS. 1 to 5 above.

Figure 7:
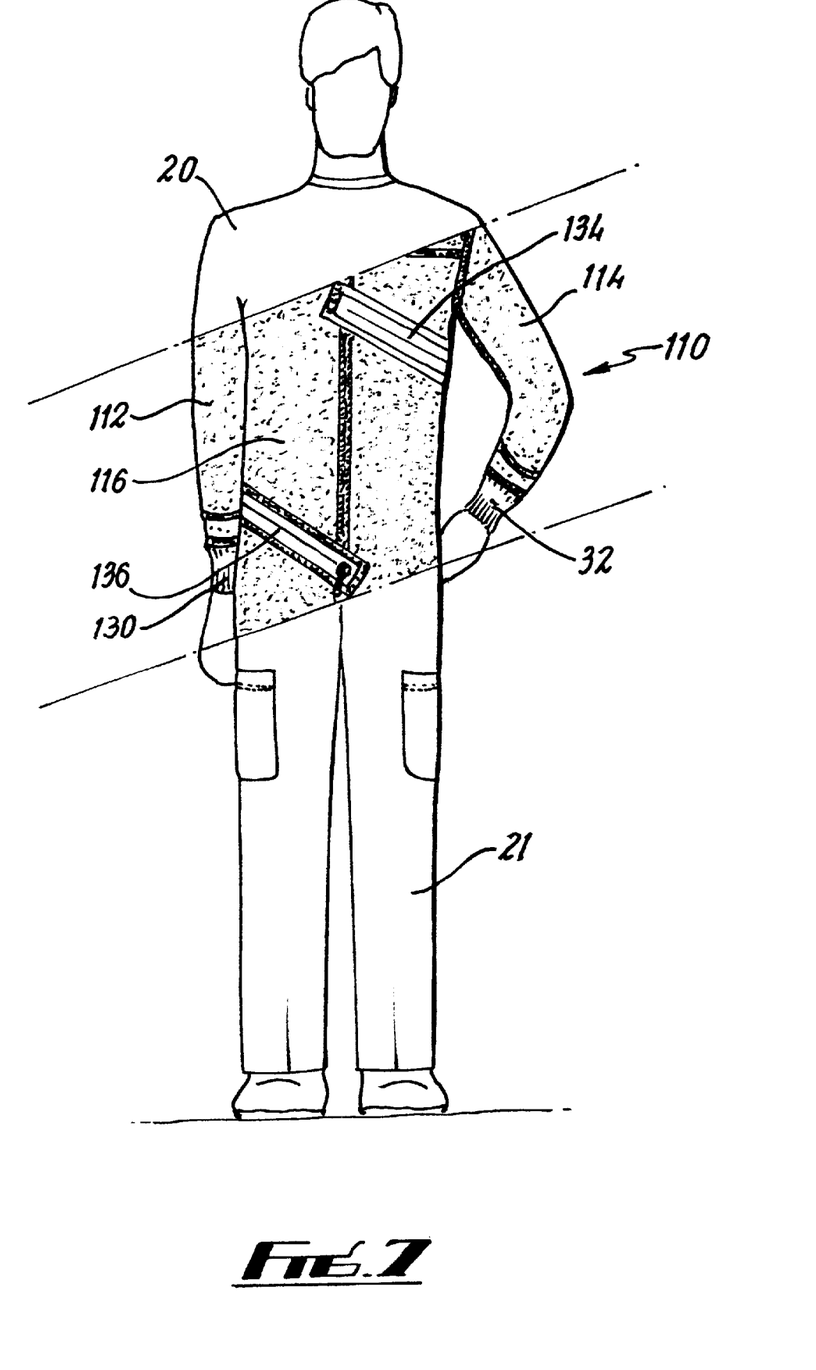
FIG. 7 is a diagrammatic part sectional front view of the embodiment shown in FIG. 6 worn by a wearer.

As can be seen from FIG. 7, the garment 110 can be worn as an intermediate layer over a layer of clothing such as underwear 20, and is protected by an outer layer of clothing 21.

Figure 6:
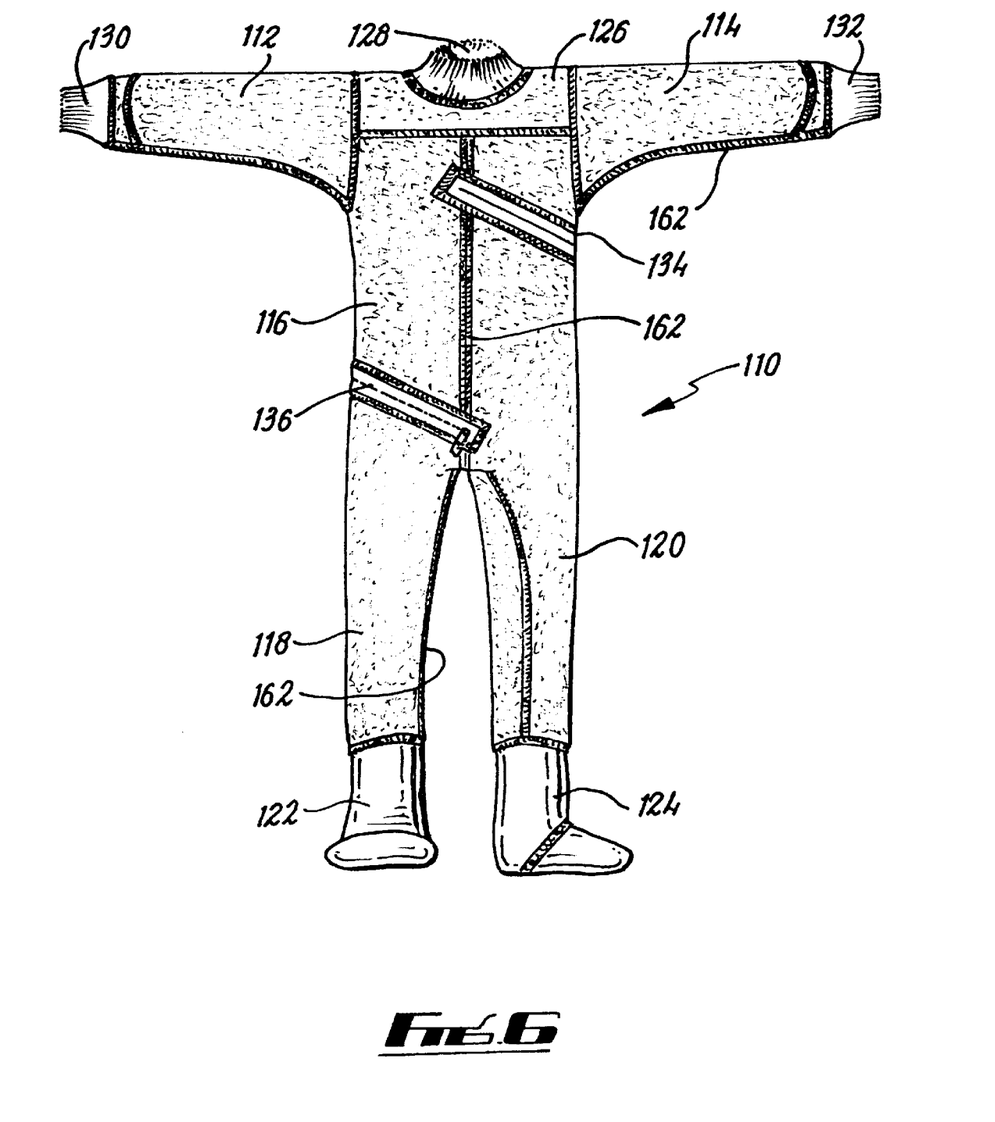
FIG. 6 is a diagrammatic front view of another embodiment of the garment according to the invention.
Figure 8:
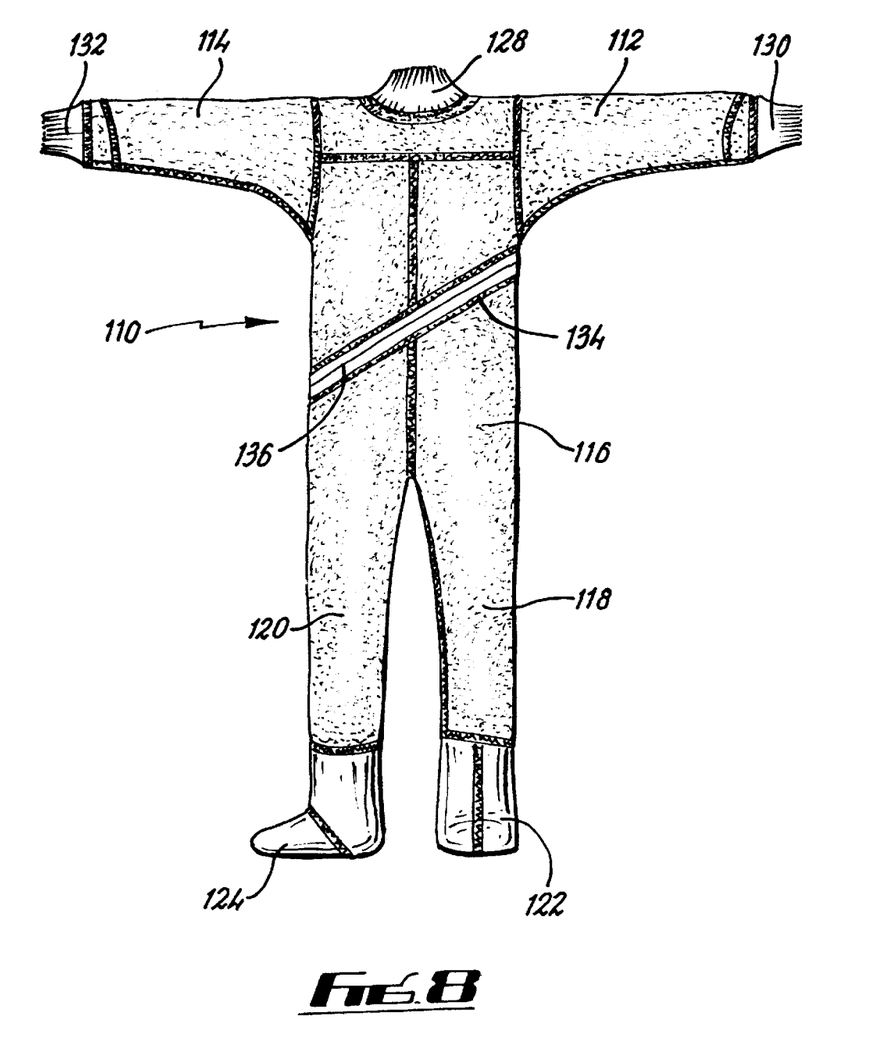
FIG. 8 is a diagrammatic rear view of the embodiment shown in FIG. 6.

The garment 110 comprises first and second arm portions or sleeves 112, 114, a trunk portion 116, first and second leg portions 118, 120 and first and second sock portions 122, 124. A neck portion 126 is also provided which surrounds the neck of the wearer.

Water is prevented from entering the inside of the garment by sealing means in the form of a neck seal 128 and first and second wrist seals 130, 132. The neck seal 128 and the wrists seals 130, 132 are formed of an elastic material, for example neoprene, and are resiliently flexible to fit closely against the skin to achieve a watertight seal when the garment 110 is worn.

The garment 110 further includes an opening 134 which is provided around the torso portion of the garment. The opening 134 extends in a helical manner from the upper region of the front of the torso portion around the back to the lower region of the front of the torso portion 116 of the garment 110. The opening permits the wearer to get easily in and out of the garment 110 and is sealable by means of a waterproof zip 136. The zip is in the form of a plastic coil mounted on a polyurethane coated fabric. Each coil is embedded and secured in a plastics material. A suitable such zip is sold under the trade name Tizip Super-Seal.

Figure 9:
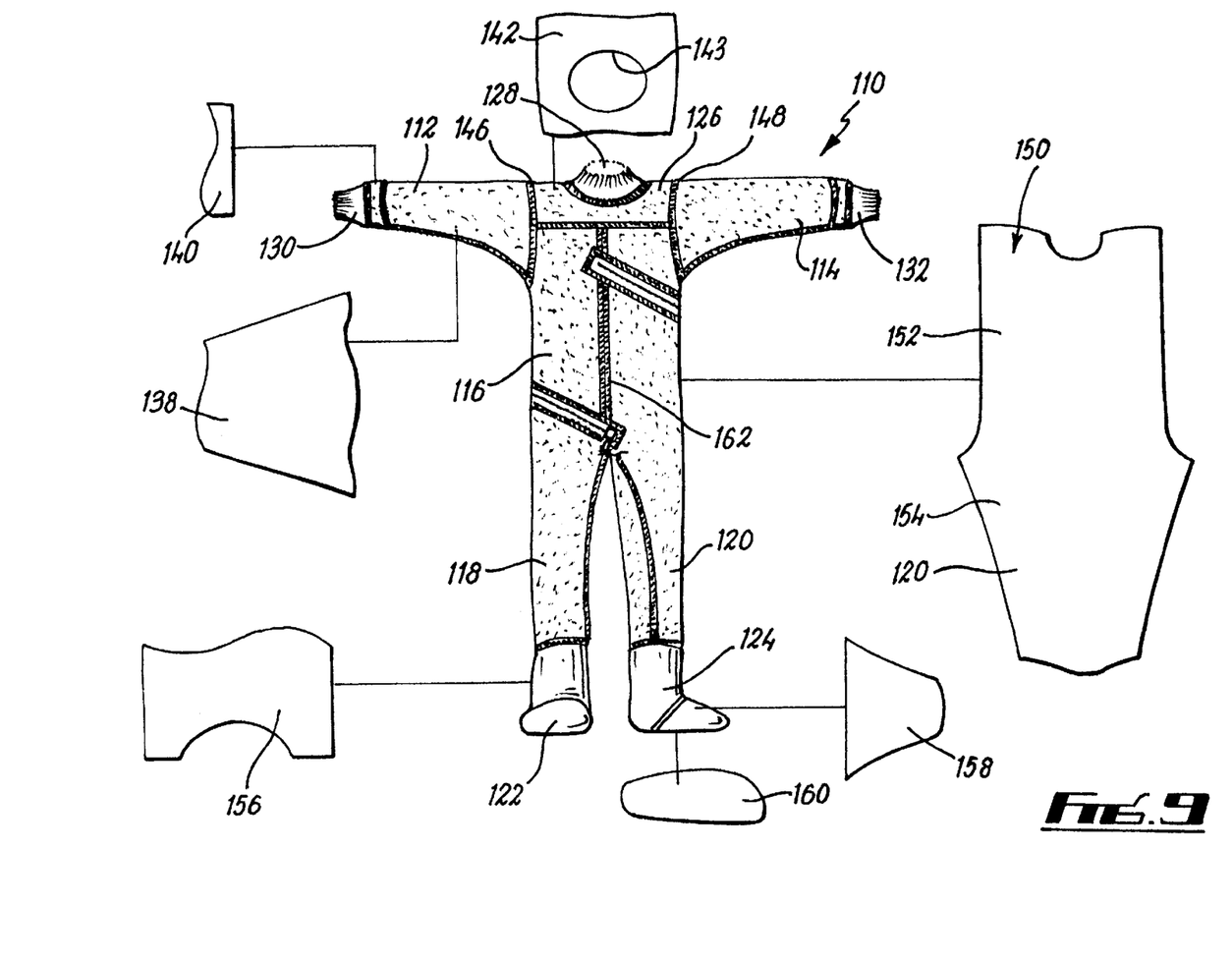
FIG. 9 is a diagrammatic front view showing the parts of which the embodiment shown in FIG. 6 is formed.

Referring to FIG. 9, there is shown the shape and configuration of the various parts from which the garment 110 is formed. As can be seen, the arm portion or sleeve 112 is formed from a first main sleeve section 138 and a second wrist sectopm 140. The wrist section 140 is connected to the main sleeve section 138, and the wrist sealing means 130 is connected to the wrist sleeve part 140. A similar arrangement, although this is not shown, is provided for the other arm portion or sleeve 114.

The neck part 126 of the garment is formed from a single piece 142 which is connected to the main sleeve part 138 of both sleeves 112, 114 at the shoulders 146, 148.

The torso portion 116 of the garment 110 is formed from two main body parts, only one of which 150 (the left part when viewed from a point of view of the wearer) is shown. The main body part 150 comprises a section 152 for the left side of the torso, and a section 154 which corresponds to the leg part 120 of the garment 110. A similar arrangement is provided for the right hand side of the garment Each of the sock portions 122, 124 is formed from three parts, namely an ankle part 156 an upper foot part 158 and a lower foot part 160.

Each of the edges of the parts forming the garment is attached either to an adjacent edge of an adjacent part or to an adjacent edge of the same part by seams 162 which are sealed. The seams 162 are the same as described above and shown in FIG. 4. As can be seen, the seams 162 extend outwardly from the garment 110.

The neck part 142 defines an aperture 143 through which the head can be received and the neck sealing portion 128 is attached thereto.

There is thus described a survival garment for protecting a wearer from the effects of cold water immersion. The garment is suitable for preventing cold shock and provides limited protection against immersion hypothermia. Usually survival suits are considered too restrictive for wearing during normal operations in the offshore industry. The advantage of the survival garment as hereinbefore described, is that the garment does not significantly impair movement of the wearer. Further, the garment does not affect the performance of the outer layer of clothing.

The material from which the sock portions 122, 124 are formed maybe a trilaminate material and is preferably stretchable. The outer layer maybe formed from nylon and an elastomeric material, for example spandex. The outer layer maybe, for example 70% nylon 6, 6 and 30% spandex.

The middle layer may be a waterproof breathable membrane, for example formed from expanded polytetrafluoroethylene or for example as sold under the trade mark Gore-Tex. The inner layer may also be a stretchable material formed from nylon and an elastomeric material for example 89% nylon 6,6 and 11% Spandex.

Referring to FIG. 3, the tape 16, which is used in the seams 43, 162 is a polyamite tape having a polytetrafluoroethylene membrane on the inside but the membrane is provided with a thin coating of polyurethane and includes a polyurethane adhesive.

The seals used in the wrist seals 12, the ankle seals 13 and the neck seal 11 of the garment 10, and the wrist seals 130, 132 and the neck seal 128 is formed of a single faced neoprene, for example formed of Du Pont Polychloroprene Polymer which has a low friction inner surface and an outer surface which is formed from a nylon textured yarn, for example 220g/YD70 denier the connection between the seals and the main body of the material having similar construction to the seals shown in FIG. 4, but differ in that the tape used around the seals is formed from rubber.

The method of sealing each of the seams, including the seams around the neck, ankle and wrist seals is by applying the tape to the garment and then applying heat to the tape to heat the adhesive to temperatures of up to 600° C. A pressurised roller is then applied to the tape on the seam to fix it thereto.

The method of applying the rubber tape to the seals is to apply the rubber tape using a two part adhesive and then a further seam seal tape as described above is then applied under heat and pressure overlapping the rubber tape and the main garment material. The seam seal tape is applied in the same way as the application of the tape as described in the preceding paragraph.

The zip 136 is attached to the garment by first sewing the garment together. Thereafter the oppening 134 is cut to the appropriate size and shape in the garment. The zip 136 is then sewn into the garment such that the edge of the zip is maintained on the outer face of the material. The tape 16 is then applied to the seam between the zip and the material in the manner as described above to seal the seam.

Various modifications may be made without departing from the scope of the invention. For example, the material of the garment could comprise more layers, to improve the insulating properties and/or the breathable properties and/or the water-resistant properties of the material.

The seals could be made of other elastic materials such as rubber. Further, the garment could be provided with buoyancy aids to provide buoyancy when the wearer is immersed in water. In this way it is achieved that the wearer need only wear a single garment which includes everything necessary for surviving in cold water. The garment could also consist of two or more parts, such as an upper part and a lower part. The parts could be interconnectable by means of a water-resistant seal.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A garment suitable for wearing under a layer of clothing, the garment being a close fitting, one-piece, intermediate dry suit formed of a laminated material comprising a first thermally insulating inner layer and a second substantially water resistant outer layer and being formed from a plurality of interconnected parts each part having an edge such that the inner layer of one part engages the inner layer of an adjacent part so that the edges of each part face away from a wearer to form a seam.

2. A survival garment according to claim 1, wherein the garment is constructed that the first layer is arranged to be closest to the wearer in use.

3. A garment according to claim 1, wherein the material includes a third layer arranged on the opposite face of the second layer to the first layer, the third layer being suitable for protecting the second layer.

4. A garment according to claim 3, wherein the third layer is formed from a synthetic polymeric material.

5. A garment according to claim 4, wherein the synthetic polymeric material is one or more of polychal FR, polyester and nylon.

6. A survival garment according to claim 5, wherein the outer layer is formed by knitting.

7. A garment according to claim 1 wherein the second layer is substantially waterproof thereby substantially preventing the passage of liquid water therethrough.

8. A garment according to claim 1, wherein the first layer is formed of a fleece material and the second layer is formed of a material capable of allowing the passage of water vapour therethrough.

9. A garment according to claim 1, wherein the garment comprises a torso portion to cover the torso of the wearer, arm portions to cover the arms of the wearer and leg portions to cover the legs of the wearer, each portion comprising one or more parts, the parts being configured such that the movement of the wearer is substantially unrestricted.

10. A garment according to claim 9, wherein the arm portions consist of one or more parts, the torso portion consists of a front torso part and a back torso part, the leg portions consist of a front leg part and a back leg part, the front leg part comprising an upper front leg part, a knee part and a lower front leg part.

11. A garment according to claim 9 wherein the arm portion comprises a main sleeve section and an end sleeve section, a single main body part is provided on each side of the torso portion and comprises a torso part and a leg part, and the garment further includes a sock part.

12. A garment according to claim 11 wherein the sock portion comprises an ankle part, an upper foot part and a lower foot part.

13. A garment according to claim 9, wherein the garment is provided with sealing means at the end of the arm portions and the neck portion for preventing water from entering the inside of the garment when in use.

14. A garment according to claim 13 wherein the garment is provided with sealing means at the end of each leg portion.

15. A garment according to claim 13, wherein the sealing means is integrally formed with the garment.

16. A garment according to claim 13, wherein the sealing means is attached to the garment by one or more of sewing, gluing, taping, and heat treatment.

17. A garment according to claims 13, wherein the sealing means comprise fittings which fit closely to the skin of the wearer, the skin-tight fittings comprise one or both of cuffs and sleeves.

18. A garment according to claim 17, wherein the skin-tight fittings are made from an elastic material coated with a material of a low friction for allowing easy donning and doffing of the garment.

19. A garment according to claim 1 whereas the garment is provided with a sealable opening for donning and doffing of the garment, and the opening is sealable by means of a waterproof zip, the opening being provided on the garment such that when the opening is sealed, the zip extends around the garment in a helical configuration.

20. A garment according to claim 19 wherein the zip extends from front of the garment around the rear of the garment to the front thereof.

21. A garment according to claim 1, wherein the garment is provided with a sealable opening for donning and doffing of the garment, and the opening is sealable by means of a waterproof zip, the opening being provided on the garment such that when the opening is sealed, the zip partially surrounds the neck portion and extends to the front of the garment.

22. A garment according to claim 1, wherein the material is a breathable, laminated, lightweight material, thermally insulated to prevent the wearer from losing heat, selected such as to prevent the wearer of the garment from cold shock and protect the wearer against immersion hypothermia.

23. A garment according to claim 1, wherein the seam is secured by one or more of sewing, gluing and heat treatment.

24. A garment according to claim 1, wherein a sealing member in the form of a tape is applied over the seam.

25. A garment according to claim 24, wherein the tape extends across the seam onto the outer layers of adjacent parts.

* * * * *